Patented Jan. 3, 1950

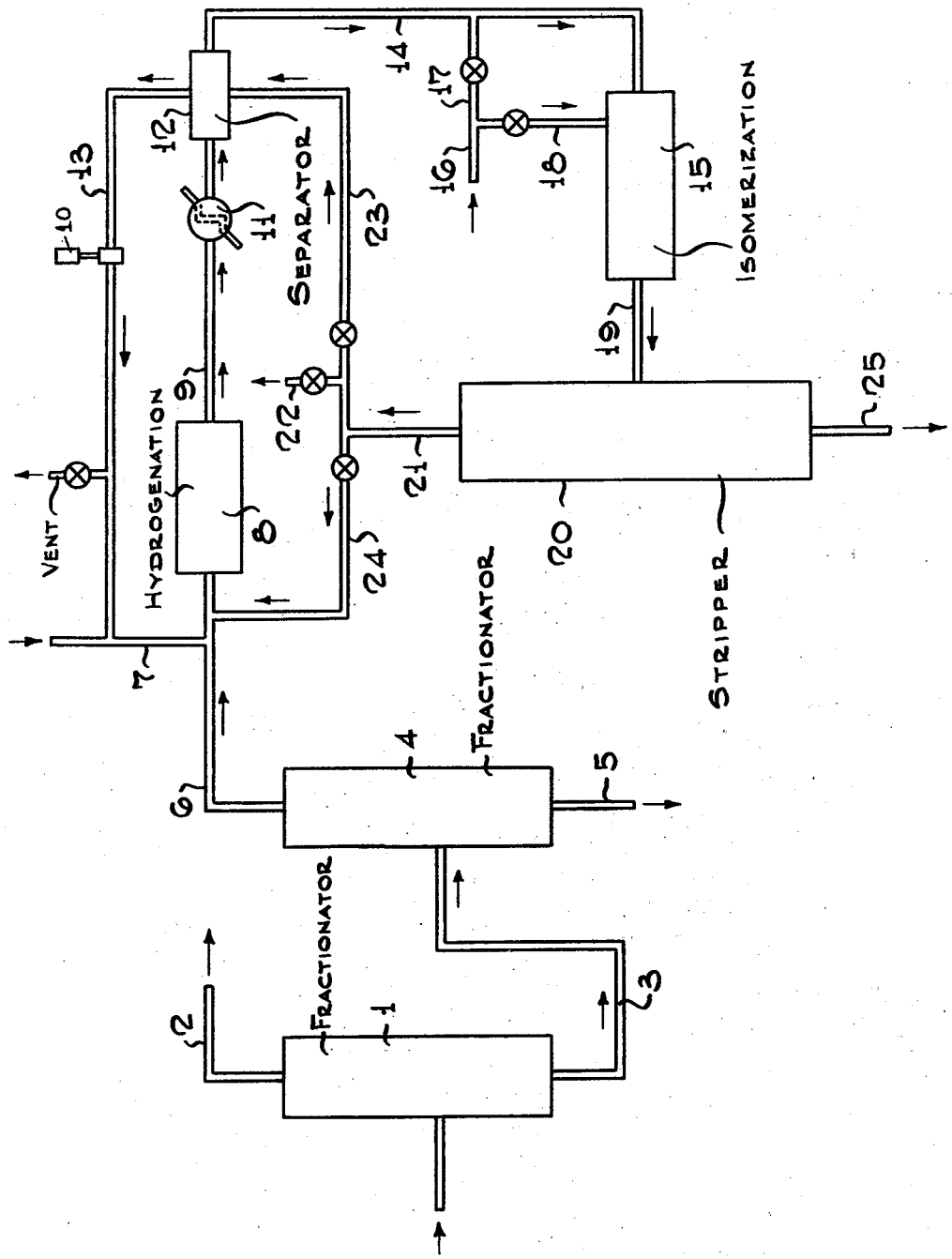

2,493,499

UNITED STATES PATENT OFFICE 2,493,499

PRETREATING HYDROCARBONS TO BE ISOMERIZED

Stephen F. Perry, Roselle, N. J., assignor to Standard Oil Development Company, a corporation of Delaware Application December 28, 1946, Serial No. 718,922

2 Claims. (Cl. 260—683.5)

This invention relates to the conversion of hydrocarbons, particularly the straight chain paraffins, to produce the corresponding branched chain paraffins by means of a catalytic isomerization reaction. More particularly, the invention relates to the isomerization of normal hexane to isohexanes by subjecting the normal hexane or a hydrocarbon mixture containing normal hexane such as a light naphtha fraction boiling up to 160° F. to the catalytic action of a Friedel-Crafts catalyst, either with or without the use of a suitable carrier such as a porous alumina, and in the presence of promotional amounts of a halogen-containing promoter, for example a hydrogen halide such as hydrogen chloride or hydrogen bromide, under isomerization reaction conditions. The resultant product is found to be useful as a constituent of motor fuel for improving the octane number thereof.

The isomerization of normal paraffins to isoparaffins in the presence of Friedel-Crafts type catalysts, of which aluminum chloride is a typical example, and in the presence of promotional amounts of halogen-containing promoters, of which hydrogen chloride is a typical example, is old. Numerous processes have been devised, both vapor phase and liquid phase, for the isomerization of normal paraffins to the corresponding isoparaffins. Although the problem of inhibiting cracking and degradation of the feed stocks and the products of the reaction is less pronounced in the case of the isomerization of normal butane to isobutane, when the higher homologues of normal butane are subjected to isomerization a real problem presents itself to limit and inhibit insofar as possible the cracking and degradation of the reactants and the products of the reaction. This necessarily is a detriment to the commercial development of isomerization processes utilizing normal pentane, normal hexane and the higher homologues as feed stocks to produce the corresponding branched chain isoparaffins. Generally less drastic reaction conditions, among which may be mentioned lower temperatures, are employed for the higher homologues of normal butane than are used when isomerizing normal butane. Various expedients have been employed to increase catalyst life, such as pretreating the feed stocks to remove traces of water, olefins, aromatic hydrocarbons and sulfur and sulfur compounds. Elemental or molecular hydrogen has been employed to minimize degradation of the catalyst and the removal of aromatic compounds by selective solvents such as liquid sulfur dioxide, aluminum chloride-hydrocarbon complexes, nitrobenzene, furfural and the like has been resorted to. United States Patent No. 2,260,279 of October 21, 1941, discloses the harm suffered in isomerizing normal paraffins where appreciable quantities of aromatics are present in the feed stock. Drastically reduced yields of isoparaffins were obtained where the feed stock contained as little as 5% by volume of aromatics.

It is therefore desirable to remove these materials from the feed stock preliminary to isomerization. This has previously been done by treatment with fuming sulfuric acid, by hydrogenation and the like. It has now been found that hydrogenation catalysts consisting of from 0.5 to 5%, preferably 2%, of palladium or platinum deposited in alumina or other support of high surface area are particularly effective as hydrogenation catalysts in removing aromatic compounds at relatively mild conditions. It is particularly desirable that the hydrogenation be carried out in the vapor phase and that the effluent be condensed under conditions such that the amount of hydrogen desired in the subsequent isomerization step be dissolved and that any excess hydrogen be separated and recirculated. The hydrogenation and isomerization steps may be carried out at the same pressure or the hydrogenation step may be carried out under a lower pressure than the isomerization in which case the effluent from the hydrogenation is compressed to the pressure desired in the isomerization and any excess hydrogen separated and recycled. The solution of hydrogen in the aromatic-free feed stock is then subjected to an isomerization treatment over an aluminum chloride catalyst in the presence of a hydrogen halide promoter and under liquid phase conditions and subsequently stripped of hydrogen chloride and unused hydrogen. The hydrogen chloride-hydrogen mixture is recycled to the hydrogenation and/or isomerization reactors, or desirably to the condenser where the effluent from the hydrogenation is condensed.

If desired the recycle streams may be subjected to stripping, to treatment with caustic or to any other method so as to remove the hydrogen chloride before the stream enters the hydrogenation zone. Similarly the streams may also be treated to remove hydrogen sulfide, for example by treatment with aluminum chloride.

The hydrogenation step may also be carried out in the liquid phase, preferably with multiple injection of hydrogen so as to dissolve the hydrogen as it is consumed. In this embodiment the HCl-hydrogen mixture recycled from the isomerization zone is preferably introduced at one or more of the injection points.

The aluminum chloride catalyst used in the isomerization step is preferably deposited on alumina which is desirably in a substantially completely dehydrated state, i. e. below 2% water. The alumina need not be pre-impregnated with aluminum chloride, although this is a desirable method of forming the catalyst mass. A simple admixture of the alumina and aluminum chloride is sufficient. Suitable aluminas for use in conjunction with the present invention comprise alumina gel, activated alumina, Porocel, gibbsite, böhmite and the like. In each case it is desirable that these aluminas be pretreated at elevated temperatures to remove therefrom a sufficient amount of water of absorption and water of hydration so that no appreciable further amounts of free water are given off during the isomerization reaction because of the fact that free water in contact with aluminum chloride tends to hydrolyze the same and to that extent decrease the available aluminum chloride present for catalyzing the isomerization reaction. In general, temperatures ranging between about 100° F. and 300° F., preferably between 150° F. and about 225° F., are employed for the isomerization, with contact times ranging between about ten minutes and about five hours, depending of course upon the specific temperature and other reaction conditions maintained. In pretreating the alumina carrier to partially remove the water contained therein, temperatures ranging between about 500° F. and about 1200° F. and times of contact of between about 30 minutes and about 12 hours are usually sufficient to remove any water which might be given off during the isomerization reaction.

The aluminum chloride may be admixed with from 1 to 10 times its weight of the alumina carrier and heated to a temperature some 50 to 100 degrees in excess of the highest temperature to be employed in the isomerization reaction while passing therethrough a stream of inert gas such as nitrogen or carbon dioxide, or, if desired, vapors of normal butane or other light hydrocarbon may be passed therethrough to purge loosely held and excess aluminum chloride from the pores of the alumina carrier.

A suitable catalyst for carrying out the isomerization process of the invention is prepared by first heating Porocel to a temperature of about 1000° F. for 4 to 5 hours to drive off free and combined water to the extent that the final catalyst carrier contains on the order of 1 to 3% of total water content. Aluminum chloride in the amount of between 5 and 30 weight per cent of the carrier is then introduced into the catalyst mass under substantially operating conditions, by sublimation with the hydrocarbon and hydrogenated benzene feed (in the case of vapor phase operation) or by solution in the feed (for liquid phase operation). The promoter generally employed is hydrogen chloride but any suitable halogen-containing promoter such as hydrogen bromide, carbon tetrachloride, methyl, ethyl, propyl, butyl chlorides or bromides, may also be employed. The amount of promoter present ranges usually between about 0.1 and about 10 weight per cent of the feed stock, and preferably between about 0.2 and about 2.0%. The present operation is carried out at temperatures between about 100° F. and about 300° F., preferably between about 150° F. and about 225° F.

The conditions employed in the hydrogenation step, as pointed out above, are relatively mild. Suitable temperatures range from 200° to 400° F. and pressures from atmospheric to 50 atmospheres.

Referring now to Figure 1 a total naphtha cut from crude distillation is introduced into tower 1 and distilled to remove butane and lighter overhead through line 2. Pentane and heavier is taken from the bottom of tower 1 through line 3 and introduced into a fractionation column 4 where a cut is made at 200° F., materials boiling over 200° F. being removed through line 5 and used as feedstock for reforming or other processing. The light naphtha fraction boiling below 200° F. is removed overhead through line 6 and mixed with hydrogen introduced through line 7 in the ratio of 1500 cu. ft. of hydrogen per barrel of naphtha. The mixture of light naphtha and hydrogen is then introduced in the vapor phase into hydrogenation zone 8 under the desired pressure for example, about 200 lbs. per sq. in. where it is contacted with a catalyst consisting of 2% palladium deposited on activated alumina at 400° F. The naphtha feed rate is 1.0 v./v./hr. (volumes naphtha per volume catalyst/hr.). The effluent from the hydrogenation zone 8 together with the unreacted hydrogen is withdrawn through line 9, cooled in cooler 11, and condensed in separator 12 where any undissolved hydrogen is removed through line 13 recompressed to 200 lbs. in compressor 10 and recycled to reactor 8. In this manner the products from the hydrogenation unit are condensed under sufficient pressure so that all the hydrogen needed in the subsequent isomerization step is dissolved in the condensate. This condensate is passed through line 14 to isomerization zone 15 where it contacts aluminum chloride adsorbed on alumina, at temperatures between 100° F. and 300° F.

Simultaneously with the introduction of the condensate into reactor 15, hydrogen chloride is introduced into the system through lines 16 and either branch lines 17 or 18. The hydrogen chloride is introduced at such a rate that a concentration of between 0.2% and 2.0% by weight based on the light naphtha charged to reactor 15 is at all times maintained in the catalyst mass. The reacted effluent passes from reactor 15 through line 19 into stripping column 20 wherein hydrogen, hydrogen chloride and some hydrocarbon vapors are removed overhead through line 21 and may be withdrawn from the system through line 22. Preferably, however, they are recycled to condenser-separator 12 by line 23. Alternatively they may be recycled in whole or in part through line 24 to hydrogenation reactor 8. Bottoms from stripper 20 are removed through line 25 and suitably treated to produce finished aviation or motor gasoline blending stocks.

The following data illustrates the advantages to be obtained by hydrogenating a normal hexane cut with 2% palladium on activated alumina according to the teachings of this invention.

| Run No | 1 | 2 | 3 |
|---|---|---|---|
| *Hydrogenation Conditions* | | | |
| Catalyst | 2% Pd on Al$_2$O$_3$ | | 2% Pt. on Al$_2$O$_3$ |
| Temperature, °F | 400 | 200 | 400 |
| Pressure, lb./sq. in | 50 | atm. | 50 |
| Naphtha Feed Rate, v./v./hr | | 1.0 | |
| Hydrogen Feed Rate, CF/B | | 1,500 | |
| Length of Run, hours | 6 | 6 | 4 |
| Catalyst Age, hours | 20 | 8 | 16 |

| Product Inspections | Feed | | | |
|---|---|---|---|---|
| Benzene Content, vol. percent by U. V | 6.0 | [1] 0.3 | 3.6 | 0.6 |
| ASTM Clear Octane No | 57.4 | 48.1 | 57.4 | 56.8 |
| Gravity, °API | 73.7 | 75.1 | 73.9 | 74.5 |
| Naphtha Distillation: | | | | |
| I. B. P., °F | 153 | 153 | 153 | 151 |
| 10%, °F | 153 | 154 | 154 | 154 |
| 50%, °F | 154 | 155 | 155 | 154 |
| 90%, °F | 155 | 158 | 158 | 158 |
| F. B. P., °F | | | | 208 |
| Recovery, percent | 98.0 | 98.0 | 99.5 | 99.0 |
| Loss, percent | 1.6 | 1.4 | 0.3 | 0.6 |

[1] Maximum value; may be high due to U. V. interference.

Isomerization of the product from run No. 1 in the presence of the dissolved H$_2$ gave results similar to those obtained using a feed from which the benzene had been removed by treatment with oleum. On the other hand when employing the product from run No. 2 containing 3.6% benzene, little isomerization activity was observed and the catalyst was discolored. The following comparative data illustrate the improved isomerization results achieved.

Isomerization conditions: 20 wt. per cent AlCl$_3$, 60 wt. per cent Porocel, 0.2 wt. per cent HCl, five 15 min. cycles at 212° F. in shaking bomb.

| Run No | 4 | 5 | 6 |
|---|---|---|---|
| Feed Pretreatment | Oleum | Hydrogenation | |
| Residual Benzene Content, Vol. Per Cent | 0.1 max | 0.3 max | 3.6 |
| Isomerization Results: | | | |
| ASTM Clear Octane Number— | | | |
| Feed | 53 | 58 | 57 |
| Product | 68 | 71 | 60 |
| Increase | 15 | 13 | 3 |
| Appearance of Used Catalyst | Lt. Gray | Lt. Gray | Green |

While the above process has been described in connection with the removal of aromatics from the feed to an isomerization unit, it may also be applied to the removal of any undesired unsaturated compound, for example, olefins.

The nature and objects of the present invention having been thus described and illustrated, what is claimed as new and useful and is desired to be secured by Letters Patent is:

1. A process of isomerizing a light naphtha fraction containing olefins and aromatics in the presence of aluminum chloride deposited on alumina and a hydrogen halide promoter which comprises treating the light naphtha fraction in the vapor phase in a first step with excess hydrogen under a pressure not more than 50 atmospheres, and a catalyst consisting of 2% palladium on alumina to saturate the olefins and aromatics, condensing and cooling the hydrogenated light naphtha in the presence of the hydrogen and under the pressure to be used in a subsequent isomerization step to substantially saturate the hydrogenated light naphtha with hydrogen at the pressure of the subsequent isomerization step, whereby a portion of the hydrogen dissolves therein, separating undissolved hydrogen and recycling it to the hydrogenation step, subjecting the light naphtha fraction in a second step in the presence of the dissolved hydrogen to the isomerizing action of the aluminum chloride and hydrogen halide, stripping hydrogen halide and hydrogen from the isomerized product and recycling the said hydrogen halide to the isomerization step and recycling the said hydrogen to the hydrogenation step.

2. A process of isomerizing a light naphtha fraction containing olefins and aromatics in the presence of aluminum chloride deposited on alumina and a hydrogen halide promoter which comprises treating the light naphtha fraction in the vapor phase at a pressure of 200 lbs. per sq. in. in a first step with excess hydrogen and a catalyst consisting of 2% palladium on alumina to saturate the olefins and aromatics, condensing and cooling the hydrogenated light naphtha in the presence of the hydrogen without releasing the pressure, whereby a portion of the hydrogen is dissolved in the condensate, separating undissolved hydrogen from the condensate, and recycling it to the hydrogenation step, subjecting the light naphtha fraction in a second step in the presence of the dissolved hydrogen to the isomerizing action of the aluminum chloride and hydrogen halide, stripping hydrogen halide and hydrogen from the isomerized product and recycling the said hydrogen halide to the isomerization step and the said hydrogen to the hydrogenation step.

STEPHEN F. PERRY.

REFERENCES CITED

The following references are of record in the file of this patent:

UNITED STATES PATENTS

| Number | Name | Date |
|---|---|---|
| 1,965,956 | Dunkel et al. | July 10, 1934 |
| 2,143,364 | Taylor | Jan. 10, 1939 |
| 2,181,640 | Deanesly et al. | Nov. 28, 1939 |
| 2,299,716 | Van Peski | Oct. 20, 1942 |
| 2,327,593 | De Simo et al. | Aug. 24, 1943 |
| 2,390,883 | Iverson | Dec. 11, 1945 |